Jan. 7, 1964         A. J. BEVEVINO ETAL         3,116,972
  PROCESS FOR THE ABSORPTION OF SO₃ BY SUBSTANTIALLY PARALLEL
              FILMS OF LIQUID ABSORBENT
                Filed May 6, 1960
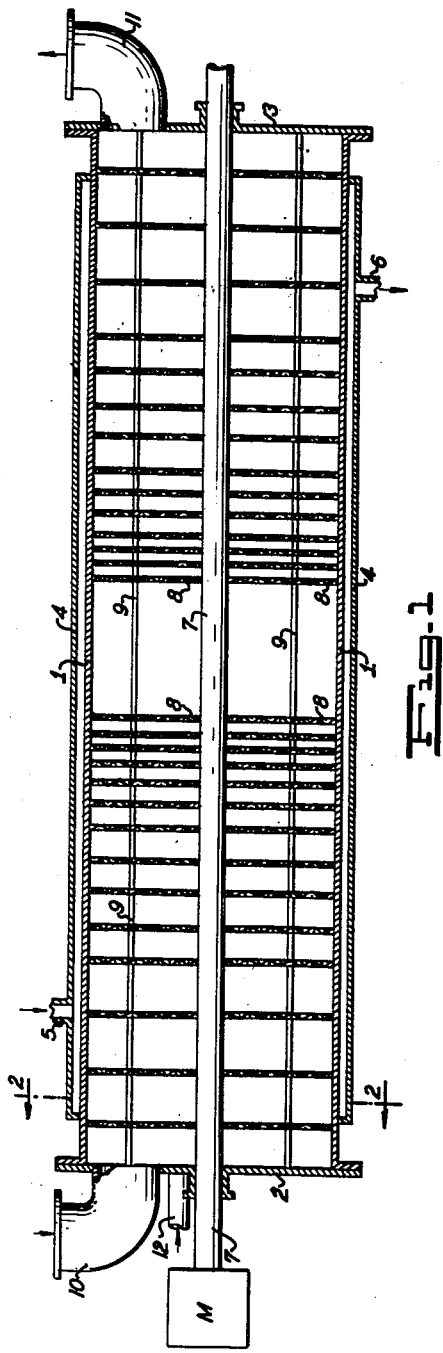
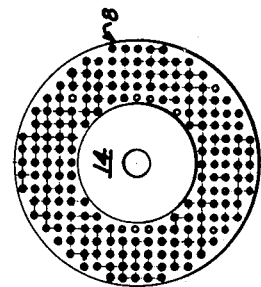
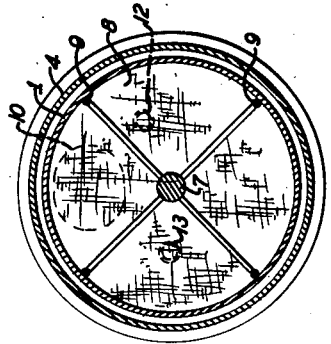
INVENTORS
ANGELO J. BEVEVINO
HENRY SONNEBORN III
BY
*Burgess, Dinklage & Sprung*
ATTORNEYS

United States Patent Office 3,116,972
Patented Jan. 7, 1964

3,116,972
PROCESS FOR THE ABSORPTION OF SO₃ BY SUBSTANTIALLY PARALLEL FILMS OF LIQUID ABSORBENT
Angelo J. Bevevino, Petrolia, Pa., and Henry Sonneborn III, Larchmont, N.Y., assignors to Sonneborn Chemical and Refining Corporation, a corporation of Delaware
Filed May 6, 1960, Ser. No. 27,320
1 Claim. (Cl. 23—174)

The invention relates to new and useful improvements in the absorption of gases by liquids. More particularly, the invention relates to an improved method for intimately contacting a compound in liquid phase with a gas, making possible the absorption by the liquid of the gas.

The absorption of gases by liquids is involved in a tremendously broad range of reactions. For example, every sulfonation reaction involving the use of gaseous $SO_3$ or sulfuric acid in gas phase, every nitration reaction involving gaseous $NO_2$ or concentrated nitric acid in gas phase, every chloro-sulfonation reaction involving gaseous chloro-sulfonic acid, every ammoniation reaction involving ammonia in gas phase, certain hydration reactions, as for example the hydration of olefinic double bonds or acetylenic bonds, are within the scope of absorption reactions as contemplated herein. Additionally, the processes of absorption by sulfuric acid of gaseous $SO_3$ to form fuming sulfuric acid or oleum or the absorption by nitric acid of gaseous $N_2O_4$ to form fuming nitric acid, etc. are improved when carried out in accordance with the invention.

In absorption reactions involving both gases and liquids, i.e. reactions in which the reactants are not present in a homogeneous phase, the common surface of contact of the reactants is of decisive importance. The smaller this surface of contact, the slower will be the reaction of the reactants. It can be appreciated that in the most unfavorable case the ratio between contact time and contact surface of the reactants can be such that a reaction under normal conditions does not occur, or only occurs to such a minor degree that such reactions are not technically practical.

Attempts have been made in the art to counteract these difficulties. For example, it has been suggested to employ additional solvents, which serve to dissolve the reactants and whereby the reaction takes place in the homogeneous phase of the solvent. Furthermore, attempts have been made to provide a large common contact surface by the finest possible mixing of the reactants. Thus, for example, the gases are split up by frits or other gas-distributing devices into very small bubbles which are conducted through the liquids.

Even the aforesaid treatment is attended by certain objections and difficulties, for example the requirement of repetitiously contacting the absorption liquid, i.e. the hydrocarbon oil or organic compound, with fresh gas, as for example $SO_3$, $NO_2$, $NH_3$ gas, to achieve a satisfactory degree of absorption, or the need for recycling the liquid which has only partially absorbed the gaseous compound, or the frequently necessary resort to contacting in a multiple number of separate steps.

The most varied equipment available in the chemical industry for contacting gases with liquids, such as columns, packed towers, spray chambers, cascade trays, etc., have been tried in connection with absorption. However, even when using the most efficient of the above systems, recycling of the reaction component to be contacted with respect to the absorption in large volumes is required to counteract the low absorption rate and short time of gas-liquid contact.

One object of this invention is to overcome the aforementioned difficulties. A further object of this invention is the novel process for effecting the contacting of the liquid absorbing compound with the gas to be absorbed without the above mentioned difficulties and on a once-through basis, with an improvement in yield of final product and diminution in quantities of reactants and equipment required.

These and still further objects will become apparent from the following description, read in conjunction with the drawing, in which:

FIG. 1 is a diagrammatic vertical section of an embodiment of an apparatus for the efficient contacting of gases and liquids for use in the process of the invention;

FIG. 2 is a diagrammatic cross-section of the apparatus shown in FIG. 1; and

FIG. 3 is a front elevation of a further embodiment of a perforated disc for use in the apparatus provided with a smaller diameter imperforate disc or portion for operation at a lower liquid level.

In accordance with the invention, the contacting of the gas, with respect to which absorption is to be effected, with the liquid compound, which is to effect the absorption, is effected by passing the liquid compound through a contacting zone, while maintaining a body of the said compound in that zone, spreading the liquid compound across the zone in a multiple number of thin, substantially parallel films, and passing the gas to be absorbed through the zone and films in contact therewith in a direction substantially normal to the films formed in the zone.

The contacting is effected by rotating a multiple number of perforated discs in a substantially horizontally extending contacting zone, in which a body of the liquid compound is maintained. A portion of each disc is in contact with the body of liquid compound, and thereby there is formed a thin film or liquid compound on each disc. Further quantities of the liquid compound are passed through the zone, and the gas to be absorbed is forced through the discs in contact with the film of liquid compound which adheres thereto. Preferably, the height of the body of liquid compound in the contacting zone is maintained so that the lower portions only of the discs are immersed therein and the gas, which is to be absorbed, is passed through the upper portions of the rotating discs in contact with the film adhering thereto.

The process of the invention may be used for any absorption reaction in which a liquid and gaseous reactant are involved. Examples of such absorption reactions include the absorption of sulfuric anhydride with sulfuric acid to form fuming sulfuric acid (oleum); absorption of $N_2O_4$ with nitric acid to form fuming nitric acid; absorption of $NO_2$ by alkanes to form the $RNO_2$ compound; absorption of $SO_2.OH$ by alkanes to form $RSO_2.OH$; absorption of $SO_2OH$ by a hydrocarbon to form $R_3C.SO_2.OH$; absorption of $SO_2Cl_2$ by a hydrocarbon to form $R.CHSO_3H.R$; absorption by benzene and toluene of $SO_3.OH$ to form the corresponding sulfonic acid; absorption by benzene and toluene of $NO_2$ (nitric acid) to produce nitrobenzene and nitrotoluene; absorption of $NO_2$ (nitric acid) by naphthalene to give 1-nitronaphthalene or 2-nitronaphthalene; absorption of ammonia by esters (R.CO.OR'), anhydrides (R.CO.OC.R) or acid halides (R.CO.X) to give the corresponding amides; the hydration of acid nitriles (R.C:N₂) to yield the corresponding amide; absorption of ammonia by phosgene to yield urea; the hydration of cyanamide to yield urea; etc.

The gas, which is to be absorbed, may be ammonia, $SO_3$, $N_2O_4$, sulfuric acid and nitric acid in gas form, chlorosulfonic acid in gas form, etc. or any gas containing such agent, as for example air. All of the reaction conditions for the absorption with respect to temperature, pressure, etc. are identical to the conventional processes, and it is only the mode of contacting which is varied.

In some instances it may be possible to reverse the physical state of the absorbent and compound to be absorbed, that is, the absorption reaction can be effected utilizing the substance, which acts as the absorbent in gaseous form, and the substance which is to be absorbed, as a liquid. An example of this type of reaction is one in which toluene is converted into p-toluene sulfonyl chloride, the chlorosulfonic acid being in the liquid phase and the toluene or organic compound in the gaseous phase. Further instances of such reactions are those in which at the reaction temperature the absorbing compound is vaporized and the absorption reaction is effected with a liquid substance, i.e., a liquid acid, as for example $HNO_3$, $H_2SO_4$, HCl.

The apparatus, in which the contacting is effected, has been described in co-pending application Serial No. 707,941, filed January 9, 1958, now abandoned, and comprises a substantially horizontally extending liquid trough with a multiple number of parallel-spaced-apart perforated discs, mounted for rotation about a substantially horizontal axis, positioned with their lower portions extending in the trough. Means defining a housing surrounds the upper portion of the disc with its inner surface in close proximity to the outer edges of the disc. Means are provided for rotating the disc and means are provided for passing the liquid compound to be absorbed through the trough and for passing the gas to be absorbed through the housing for passage through the perforated disc. The trough and housing are preferably defined by a substantially horizontally positioned cylindrical container having an inner diameter closely approximating the outer diameter of the disc. The discs are preferably mounted on a rotatable shaft extending axially through the center of the container, and scraper bars may be attached to the outer edge portions of the discs in scraping contact with the inner walls of the cylindrical container. A heating or cooling jacket may surround the container, and the disc or any other portion of the interior of the container may be provided with heating or cooling means.

In operation, the liquid compound, which is to effect the absorption, is passed in through the inlet 12 and will fill the lower portion of the cylindrical container until the level of the outlet 13 is reached. The lower portion of the cylindrical container, therefore, acts as a liquid trough. The shaft 7 is rotated by a suitable motor-driven variable speed gear reduction unit, causing rotation of the perforated discs 8 in the cylindrical container 1 closed at one end by the end closure 2 and at the other end by the end closure 3. The gas to be absorbed is then passed in through the inlet 10, flows through the perforations in the discs and may be removed through the outlet 11. The desired absorption reaction temperature may be controlled by passing the heat exchange medium, such as for example cold water, in through the inlet 5, through the jacket 4 and out through the outlet 6.

As the perforated discs 8 rotate with their lower half immersed in the liquid absorbent compound, the same pick up a thin film of the liquid compound, which is contacted by the gas flowing through the upper portion of the cylindrical container and the perforation in the discs. A very large area of the liquid absorbent compound is exposed to contact with the gas so that an extremely efficient contacting is effected. By a suitable adjustment of the speed of rotation of the shaft 7 and the rate of flow of the liquid compound in through the inlet 12 and out of the outlet 13 (FIG. 2), the liquid compound leaving through the outlet 13 absorbs the treatment gas to the desired degree. The gas flow rate between the gas inlet 10 and the gas outlet 11 may be controlled for the most efficient utilization of the gas. Due to the large specific area of the liquid compound exposed to the gas to be absorbed and due to the high degree of control permissible, complete absorption may be effected in a single pass of the liquid compound through the device, and the liquid compound flowing off at 13 may be one which has substantially effected the desired degree of absorption without any necessity for recycling or repeated contact.

The rotation of the discs through the liquid compound provides a good agitation effect, and very surprisingly and unexpectedly the gas consumption is substantially reduced, as compared to the conventional processes for obtaining the same degree of absorption, and products equal to or better than that obtained with the conventional processes are produced.

Of substantial advantage, as compared with the prior art processes, is the fact that liquid compound may be completely treated on a once-through basis, whereas in the prior art processes a repetitious contacting and recycling was required. Due to the fact that the liquid compound effects the desired degree of absorption on a once-through basis, the need for large dilution volumes is eliminated, and the same quantity of liquid compound may be so treated at much greater throughput rate and with much smaller installations and labor and power requirements than previously required.

The process of the invention particularly lends itself to sulfonation reactions, wherein gaseous sulfur trioxide is used and wherein the compound, and preferably the organic compound, to be sulfonated is either a liquid at normal temperature or is easily liquefied by heating. Thus, benzene may be contacted with gaseous sulfur trioxide to give benzene sulfonic acid, and toluene, under similar conditions, may be converted into a mixture of p-toluene sulfonic acid and ortho-toluene sulfonic acid, in which the para-isomer predominates. Other substances, which may be sulfonated according to the invention, are alkylated naphthalenes, petroleum oils, cyclic oils, such as those obtained in the refining of petroleum oils with especially selected solvents.

The process of the invention is also advantageously employed for effecting the sulfonation of benzene substituted with a kerosene fraction, that is, with straight-chain alkyl radicals. Sulfonated alkyl-benzene, as for instance dodecyl benzene sulfonate, is very advantageously prepared in accordance with the invention.

The process also lends itself to the preparation of fuming sulfuric acid, that is, to the reaction of sulfur trioxide with 66 Bé. sulfuric acid.

Nitration reactions may be conveniently carried out according to the process of the invention. Thus, for example, it is possible to prepare nitroparaffin and nitroaromatic compounds by reaction of nitric fumes with organic compounds, either of the aliphatic or aromatic type. By "nitric fumes" is meant a mixture of $NO_2$, $N_2O_3$ and NO.

It is also possible to carry out the vapor phase nitration of high-molecular weight paraffins. Thus, 67% nitric acid may be converted into the vapor phase at a temperature of about 300° C. The paraffins of high-molecular weight only form a thin liquid film at this temperature on the perforated disc.

The hydration of olefinic double bonds by means of steam, usually in the presence of a catalyst, may be advantageously carried out using the process described herein. The product is an alcohol, either primary, secondary or tertiary, according to the location of the double bond and depending on the nature of the carbon atoms which are part of the double bond, that is whether the same are substituted with other alkyl groups or with hydrogen. The hydration of compounds containing a triple bond, as for example to give acetylene acetaldehyde, methylacetylene to yield acetone, acetylene dicarboxylic acid to yield α-keto succinic acid, and 2-hydroxy-2-phenyl-3-butyne to yield 2-hydroxy-2-phenyl-3-butanone, may also be effected in accordance with the invention. Additionally, hydration products of high chemical utility may be obtained, according to the process of the invention, from oleic, linoleic and linolenic acids.

Chloro-sulfonation may be carried out according to another embodiment of this invention, employing chloro-sulfonic acid in the liquid phase and the absorbent in the gaseous phase. Toluene may in this manner be converted into p-toluene sulfonyl chloride.

Esterification reactions may be suitably and efficiently carried out in accordance with the invention, employing the catalyst hydrogen chloride as the gaseous phase and a mixture of the acid and the alcohol as the liquid phase. The reaction conditions of the esterification may be varied to be adapted to acids and alcohols, which are liquid at ordinary temperature and which boil over a wide range, as well as to acids and alcohols of high-molecular weight, which are solid at room temperature. If, for instance, it is desired to carry out the esterification of phthalic acid, isophthalic or terephthalic acid, which are solid at room temperature, it is readily possible to use sulfuric acid as the catalyst in sufficient amount so as to dissolve the organic substance, thus to use the sulfuric acid solution as the liquid phase and then to use the alcohol as the gaseous phase. If the alcohol is of a high boiling point or a solid at room temperature, it may be necessary to raise the temperature so as to maintain the alcohol in the gaseous phase. Similarly, if the alcohol is a solid, it is possible to dissolve the alcohol in the sulfuric acid layer and then to use an acid which may be maintained in the vapor phase. This, of course, requires maintaining the reaction chamber at a temperature sufficiently high to keep the alcohol component in the vapor phase.

Ammoniation reactions are very advantageously carried out according to the process of this invention. An olefin, or a conjugated olefin, or a halocompound in which the halogen is sufficiently reactive to be replaced by an amino group, is used as the liquid phase. The use of solvents may provide advantageous, according to the substances involved and whether the same are liquid or solid at the reaction temperature, by the process described.

Primary, secondary and tertiary amines may be obtained in better yield and with less incidence of side-reactions than according to the processes known in the art.

The preparation of amides from carboxylic acids may be accomplished in this manner if the organic carboxylic acids are capable of being reduced to the liquid phase.

Amides may also be prepared according to another embodiment of the instant invention by reaction of an ester with gaseous ammonia. Salicylamide, a product of great commercial value, is prepared from methyl salicylate and gaseous ammonia readily and in the pure state, i.e. free from the undesirable by-products which are responsible for the discoloration and which require a difficult and time-consuming purification.

The following examples are given by way of illustration and not of limitation, but it is to be understood that the scope of this invention is to be limited only by the appended claim and not by the examples as shown herein:

*Example 1*

The sulfonation of toluene to form para-toluene sulfonic acid was carried out. The reaction conditions for the sulfonation with respect to temperature, pressure, etc. were identical with the conventional process, only the mode of contacting was varied.

The toluene was treated in a device having the construction of that shown in FIGS. 1 and 2, namely a length of 60 inches, a diameter of 15¼ inches, and being provided with thirty-two expanded metal discs 15 inches in diameter, mounted on the shaft and spaced from each other at ½ to 3 inches. The area of each opening in the discs is 0.2 square inch and the total area of openings comprises 53–58% of the total area of the discs. The shaft on which the discs are mounted revolves at 120 r.p.m.

A stream of gaseous sulfur trioxide was passed in through inlet 10, and the tail gases were removed through outlet 11. Toluene was introduced through inlet 12 and permitted to emerge from outlet 13 at a flow rate of 1.5 gallons per minute. Cooling water was introduced at 5 and withdrawn at 6 to maintain a treatment temperature of between 75 and 80° C. The gas flow rate was controlled so that 6.3 lbs of $SO_3$ were consumed per gallon of raw stock.

Under the above conditions, the toluene was substantially completely converted to toluene sulfonic acid.

*Example 2*

The unit was filled to one half full (approximately 20 gallons) with 66 Bé. sulfuric acid. Gaseous $SO_3$ was admitted into the unit at the rate of 51 lbs. $SO_3$ per hour. The gas was discharged to the atmosphere at the open end of the observation line in a dense white plume, indicating a high concentration of $SO_3$ in the stream. The rotating element was then turned on at its normal rate of 120 r.p.m., and the $SO_3$ rate was maintained at 51 lbs. per hour. The white plume at the observation line disappeared completely, and the fume gas become colorless and invisible against a black background while observing at close range. The $SO_3$ rate was varied between 48 and 81 lbs. per hour for a period of 15 minutes, and the fume gas remained colorless.

Following the preliminary operation and observations, the absorption was continued for 15 minutes at an $SO_3$ rate of 41 lbs. per hour and for an additional 25 minutes at a rate of 48.6 lbs. per hour. During the last few minutes of the run, a slight bluish tint was detected in the fume gas, when observed against a black background. Just before completing the run, the rotating element was stopped momentarily and then started up again. The high-strength $SO_3$ stream again appeared at the observation line followed by complete disappearance, indicating that the acid batch was still absorbing $SO_3$. The batch (approximately 20 gallons) of 66 Bé. acid absorbed, as averaged from the flow measurements, approximately 40 lbs. of $SO_3$ in 55 minutes, during which time the fume gas showed no $SO_3$ as determined by visual observation.

*Example 3*

A fraction of solid paraffins, of petroleum origin (M.P. 125–128° F.) was liquefied and was treated in the device shown in the drawing. With the use of a pound of 67% nitric acid in (vapor phase) per 8 lbs. of liquid paraffin, the initial product was converted to nitroparaffins. The yield was 90% of the theoretically calculated yield.

*Example 4*

Commercial dodecyl benzene was treated in the device shown in the drawing in the manner described in Example 1. With the use of 2.5 lbs. of sulfur trioxide gas per gallon of dodecyl benzene, the initial product was converted to sulfonated dodecyl benzene. The yield was 95% of the theoretically calculated value.

*Example 5* p-Toluene sulfonyl chloride was obtained by chloro-sulfonation of toluene. Toluene in vapor phase was treated by contacting the same with chlorosulfonic acid as the liquid phase in the device shown in the drawing at a temperature of 75 to 80° C. With 6.2 lbs. of chlorosulfonic acid per gallon of toluene, chlorosulfonation of 98% of the toluene was effected in 1½ hours.

*Example 6*

Methyl salicylate was prepared as follows: A mixture of sublimed salicylic acid and gaseous methanol was contacted with phosphorous oxychloride dissolved in $CS_2$ at a temperature of 30 to 35° C. With the use of a 50% solution of phosphorous oxychloride in $CS_2$ the initial product was converted to methyl salicylate with an 85% yield.

Example 7

Terephthalic acid, dissolved in sulfuric acid, was treated as the liquid phase in the device shown in the drawing. Atomized iso-octyl alcohol in $N_2$ was admitted and the reaction proceeded immediately going to termination with the formation of iso-octyl terephthalate. The initial product was converted to iso-octyl terephthalic acid.

Example 8

Methylsalicylate was treated in the device shown in the drawing in the manner described in Example 1. With the use of 1.33 lbs. of gaseous ammonia per 12.7 gallons of methylsalicylate and at a temperature of 90 to 100° C., 95 yield of salicylamine was recovered.

Example 9

The process of the invention was applied to the removal by absorption from a gas of undesired quantities of carbon dioxide. A gas containing carbon dioxide was treated in the device shown in the drawing. The carbon dioxide containing gas was passed in contact with ethanol amine as the liquid phase. One pass through the device resulted in the substantially complete removal of all the carbon dioxide originally present in the gas.

Example 10

The process of Example 9 was repeated but for the removal of hydrogen sulfide from a gas containing the same as the liquid phase there was again utilized an ethanol amine. The results obtained were the substantial removal of the hydrogen sulfide. It can be appreciated that a gas contaminated by both $CO_2$ and $H_2S$ can easily be purified in one pass of both these contaminants.

Example 11

An aqueous sodium hydroxide solution was employed to effect the removal by absorption of $SO_3$ from a gas containing the same. In one pass through the apparatus described in FIG. 1 substantially complete removal of all of the $SO_3$ from the feed gas was effected.

Similar results were obtained when in place of the sodium hydroxide solution, a sodium carbonate solution was employed as the aqueous phase.

We claim:

In the process for the absorption of gaseous $SO_3$ by a liquid selected from the group consisting of benzene, toluene, alkylated naphthalenes and petroleum oils in which said liquid is contacted with the gaseous $SO_3$ to be absorbed, the improvement for effecting said contacting which comprises flowing said liquid through a contacting zone while maintaining a body thereof in said zone, spreading the liquid across said zone in a multiple number of thin substantially parallel films and passing the gaseous $SO_3$ to be absorbed through said zone and in a direction substantially normal to said films whereby the gaseous $SO_3$ contacts and perforates said films.

References Cited in the file of this patent

UNITED STATES PATENTS

| | | |
|---|---|---|
| 297,476 | Wallace | Apr. 22, 1884 |
| 942,181 | McGuire et al. | Dec. 7, 1909 |
| 1,002,824 | Cox | Sept. 12, 1911 |
| 1,679,792 | Slade et al. | Aug. 7, 1928 |
| 1,778,571 | Stratton | Oct. 14, 1930 |
| 1,843,647 | Bramley-Moore | Feb. 2, 1932 |
| 2,004,000 | Hechenbleikner | June 4, 1935 |
| 2,689,783 | Marullo et al. | Sept. 21, 1954 |